United States Patent
Michioka et al.

(10) Patent No.: US 6,976,399 B2
(45) Date of Patent: *Dec. 20, 2005

(54) WIPER RING AND BALL SCREW PROVIDED WITH WIPER RING

(75) Inventors: Hidekazu Michioka, Tokyo-to (JP); Katsuya Iida, Yamanashi-ken (JP); Tetsuhiro Nishide, Yamanashi-ken (JP)

(73) Assignee: THK Co., LTD, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/811,832

(22) Filed: Mar. 30, 2004

(65) Prior Publication Data

US 2004/0177711 A1   Sep. 16, 2004

Related U.S. Application Data

(62) Division of application No. 09/990,332, filed on Nov. 23, 2001, now Pat. No. 6,732,599.

(30) Foreign Application Priority Data

Nov. 24, 2000   (JP)   ............................ P2000-358245

(51) Int. Cl.$^7$ ............................................. F16H 25/24
(52) U.S. Cl. .................... 74/89.4; 74/424.82; 277/493; 277/354
(58) Field of Search ............................ 74/89.4, 424.82; 277/354, 416, 500, 543, 544, 545, 632, 493, 277/521, 533, 546

(56) References Cited

U.S. PATENT DOCUMENTS

| 1,834,616 A | 12/1931 | Hanson |
| 3,678,776 A | 7/1972 | Patterson |
| 4,082,296 A | 4/1978 | Stein |
| 5,263,724 A | 11/1993 | Hansen et al. |
| 5,722,294 A | 3/1998 | Kobayashi et al. |

FOREIGN PATENT DOCUMENTS

| GB | 2 223 282 | 4/1990 |
| JP | 2000-46142 | 2/2000 |

*Primary Examiner*—Robert A. Siconolfi
*Assistant Examiner*—Bradley King
(74) *Attorney, Agent, or Firm*—Westerman, Hattori, Daniels & Adrian, LLP

(57) ABSTRACT

A wiper ring to be applied to a nut of a ball screw having a screw shaft comprises a plurality of segments each constituted as independent element having a seal portion to be contacted to the screw shaft, support pins extending in an axial direction of the screw shaft so as to correspond to the segments, respectively, the segments being arranged in a circumferential direction of the screw shaft to be rotatable about the pins, the pins being connected to each other through support members so as to limit the relative movement of the respective pins, and a spring member for urging the segments arranged circumferential direction of the screw shaft so as to be directed towards radially central side of the screw shaft.

4 Claims, 5 Drawing Sheets

WIPER RING AND BALL SCREW PROVIDED WITH WIPER RING

CROSS-REFERENCE TO RELATED APPLICATIONS

This application is a division of U.S. patent application Ser. No. 09/990,332, filed on Nov. 23, 2001 now U.S. Pat. No. 6,732,599.

BACKGROUND OF THE INVENTION

The present invention relates to a wiper ring to be mounted to an end portion of a nut of a ball screw and also relates to a ball screw provided with such wiper ring.

Japanese Utility Model Laid-open Publication No. HEI 6-6795 disclosed such a wiper ring, in which one end side portion or entire portion of a wiper ring is divided into a plurality of segments or blocks in a circumferential direction thereof, and each of the segments is pressed towards radially center side by means of spring to thereby improve tightness between an inner peripheral portion of the wiper ring and a screw shaft disposed inside therein.

In such known art, in the structure in which only the one end side portion of the wiper ring is divided into a plurality of segments or blocks, there is usually formed a cutout portion, called "bias-cut", at one portion of the wiper ring in its circumferential direction for separating the same. However, in an arrangement in which such wiper ring is mounted to a screw shaft, the bias-cut portion is widened (opened) and the inner peripheral portion of the wiper ring is deformed unwillingly in form of non-circular shape, and for this reason, at a portion opposite to the bias-cut forming portion of the wiper ring, the segment is closely contacted to the screw shaft. However, on the side of the bias-cut forming portion, the tightness of the segment to the screw shaft is made worse. As a result, sealing performance of the ball screw may be made different at various portions, thus being inconvenient.

On the other hand, the case where the entire portion of the wiper ring is divided into a plurality of segments or blocks will cause the following defective.

In such structure, when a gap is formed between adjacent two segments in the circumferential direction thereof, the gap may be widened when the segments are shifted. In such occasion, foreign material or like may easily invade and lubricant may easily leak through the widened gap. On the contrary, when the segments are contacted to each other in order to eliminate such gap, the movement of the respective segment towards the radially central portion of the segment due to such mutual contacting will be limited, which results in degradation of tightness between the segments and the screw shaft and deterioration of the sealing performance. Furthermore, in a case where any foreign material is clogged between the segment and the screw shaft, the segment is displaced towards the radially outer peripheral side against the force of the spring pressing the segment, and hence, the inner peripheral portion of the segment is separated from the screw shaft, thus deteriorating the sealing performance and hence being defective.

SUMMARY OF THE INVENTION

An object of the present invention is to substantially eliminate defects or drawbacks encountered in the prior art mentioned above and to provide a wiper ring and a ball screw provided with the wiper ring, by which sealing performance of a screw shaft with respect to segments of the wiper ring can be enhanced.

The above and other objects can be achieved according to the present invention by providing, in one aspect, a wiper ring to be applied to a screw unit having a shaft member comprising:

a plurality of segments each constituted as independent element having a seal portion to be contacted to the shaft member;

support shafts extending in an axial direction of the shaft member so as to correspond to the segments, respectively, the segments being arranged in a circumferential direction of the shaft member to be rotatable about the support shafts, the support shafts being connected to each other through support members so as to limit relative movement of the respective support shafts; and a spring member for urging the segments arranged circumferential direction of the shaft member so as to be directed towards radially central side of the shaft member.

According to the wiper ring of this aspect, the respective segments are deformed in their attitudes so as to closely contact the shaft member such as screw shaft of the ball screw unit while being pressed towards the central side of the screw member by means of spring and rotating about the support shafts such as pins. Accordingly, the respective segments can be well contacted to the shaft member, and the improved sealing performance can be realized at any circumferential position.

Further, the support shafts of the respective segments are mutually connected to thereby limit or restrict the relative movement of the support shafts, so that the movement of the segments in the circumferential and radial directions can be properly limited. Therefore, the biting of foreign material in a widened gap between the segments in the circumferential direction can be prevented, the leakage of lubricant can be also prevented, and the degradation of the sealing performance due to the movement of the segments in the radially outer peripheral direction can be further prevented.

Further, in the present invention, the state, that the support shafts as rotational centers of the respective segments are connected to each other, means that the support shafts are connected to each other through members different from the segments or through the segments themselves to thereby restrict the relative movement therebetween. The support shafts may be constituted independently from the segment, or segment itself is utilized as support shaft.

In a preferred embodiment of this aspect, the support member is a support ring formed as a member independent from the segments and the support shafts are connected to each other through the support ring.

In this example, the respective segments are supported by the support ring to be rotatable about the support shafts such as pins. The support ring may be separated at one portion in its circumferential direction, and in such case, since the cut portion corresponding to the bias-cut in the conventional structure of the wiper ring is formed on the support ring, the wiper ring can be entirely deformed and the segments can be surely urged against the shaft member by the spring member.

Furthermore, according to this aspect, (N-2) segments in the plural segments (N: total number thereof) are formed with the support shafts and hole portions for receiving the support shafts in an arrangement shifted in the circumferential direction of the shaft member, either one of remaining two (2) segments is provided with the support shaft and another one of the remaining two segments being formed with the hole portion, the segments being connected to each other by fitting the support shafts to the hole portions of the adjacent two segments in the circumferential direction in a manner that the remaining two segments are unconnected.

According to this example, the respective adjacent segments can be supported to be rotatable about the support shafts and the respective support shafts can be connected through the segments. Therefore, no connection is made between two segments, so that the cut (separated) portion, corresponding to the conventional bias-cut, is formed and the wiper ring can be entirely deformed. Thus, the segments can be surely urged against the shaft member by the spring member.

Furthermore, it may be possible that each of the segments comprises a segment body having the seal portion and a support plate arranged in a manner shifted in the circumferential direction with respect to the segment body, either one of the support plate and the segment body is formed with the support shaft and another one thereof is formed with the hole portion.

In this example, since the support plate extends behind a slit formed between the segment bodies, so that the inside and outside portions of the wiper ring are not communicated through the slit, and hence, the invasion of foreign material can be prevented as well as leakage of the lubricant.

In another aspect of the present invention, there is also provided a wiper ring to be applied to a screw unit having a shaft member comprising:

a support ring;

a plurality of segments each having a seal portion to be contacted to the shaft member, the segments being arranged on one side of the support ring in a circumferential direction of the support ring and connected to each other to be rotatable about a predetermined support shaft with respect to the support ring; and a spring member for urging the segments arranged in the circumferential direction of the support ring towards radially central side of the support ring.

According to the wiper ring of this aspect, substantially the identical advantageous effects to those mentioned above will be achieved. That is, since the respective segments can be supported by the support ring to be rotatable about the support shafts such as pins, the respective segments are deformed in their attitudes so as to closely contact the shaft member such as screw shaft of the ball screw unit while being pressed towards the central side of the screw member by means of spring and rotating about the support shafts such as pins. Accordingly, the respective segments can be well contacted to the shaft member, and the improved sealing performance can be realized at any circumferential position.

Further, the support shafts of the respective segments are mutually connected through the support ring to thereby limit or restrict the relative movement of the support shafts, so that the movement of the segments in the circumferential and radial directions can be properly limited. Therefore, the biting of foreign material in a widened gap between the segments in the circumferential direction can be prevented, the leakage of lubricant can be also prevented, and the degradation of the sealing performance due to the movement of the segments in the radially outer peripheral direction can be further prevented.

The support ring may be separated at its one portion in the circumferential direction, and in such case, the cut (separated) portion, corresponding to the conventional bias-cut, is formed on the support ring, so that the wiper ring can be entirely deformed. Thus, the segments can be surely urged against the shaft member by the spring member.

In this aspect, a slit may be formed between adjacent segments when the segments are connected to the support ring.

In a further aspect, there is provided a wiper ring to be applied to a screw unit having a shaft member comprising:

a plurality of segments each having a seal portion to be contacted to the shaft member, the segments being arranged in a circumferential direction of the shaft member; and a spring member for urging the segments arranged in the circumferential direction of the shaft member in the radially central direction of the shaft member, wherein (N-2) segments in the plural segments (N: total number thereof) are formed with support shafts extending in an axial direction of the shaft member and hole portions for receiving the support shafts in an arrangement shifted in the circumferential direction of the shaft member, either one of remaining two segments is provided with the support shaft and another one of the remaining two segments being formed with the hole portion, the segments being connected to each other by fitting the support shafts to the hole portions of the adjacent two segments in the circumferential direction in a manner that the remaining two segments are unconnected.

According to the wiper ring of this aspect, the respective adjacent segments are supported to be rotatable about the support shafts such as pins, so that the respective segments are deformed in their attitudes so as to closely contact the shaft member such as screw shaft of the ball screw unit while being pressed towards the central side of the screw member by means of spring and rotating about the support shafts. Accordingly, the respective segments can be well contacted to the shaft member, and the improved sealing performance can be realized at any circumferential position.

Further, the support shafts of the respective segments are mutually connected to thereby limit or restrict the relative movement of the support shafts, so that the movement of the segments in the circumferential and radial directions can be properly limited. Therefore, the biting of foreign material in a widened gap between the segments in the circumferential direction can be prevented, the leakage of lubricant can be also prevented, and the degradation of the sealing performance due to the movement of the segments in the radially outer peripheral direction can be further prevented.

Furthermore, the connection between the adjacent two segments is interrupted, the cut (separated) portion, corresponding to the conventional bias-cut, is formed on the support ring, so that the wiper ring can be entirely deformed. Thus, the segments can be surely urged against the shaft member by the spring member.

In this aspect, a slit is formed between adjacent segments when the respective segments are connected.

In still further aspects of the present invention, there are provided ball screw or ball screw units each comprising:

a screw shaft;

a number of rolling members to be applied to the screw shaft;

a nut mounted to the screw shaft through the rolling members; and a wiper ring mounted to at least one axial end portion of the nut, the wiper ring comprising the elements or members mentioned above with respect to first, another and further aspects of the present invention.

According to the ball screw (unit) utilizing the wiper ring of the above aspects, the wiper ring is mounted to at least one end portions of the nut, so that the durability of the nut against the foreign material or like can be achieved with the improved sealing performance of the wiper ring.

Further, it is to be noted that the nature and further characteristic features of the present invention will be made more clear from the following descriptions made with reference to the accompanying drawings.

DESCRIPTION OF THE PREFERRED EMBODIMENT

One preferred embodiment of the present invention will be described hereunder with reference to the accompanying drawings.

Figure 1:
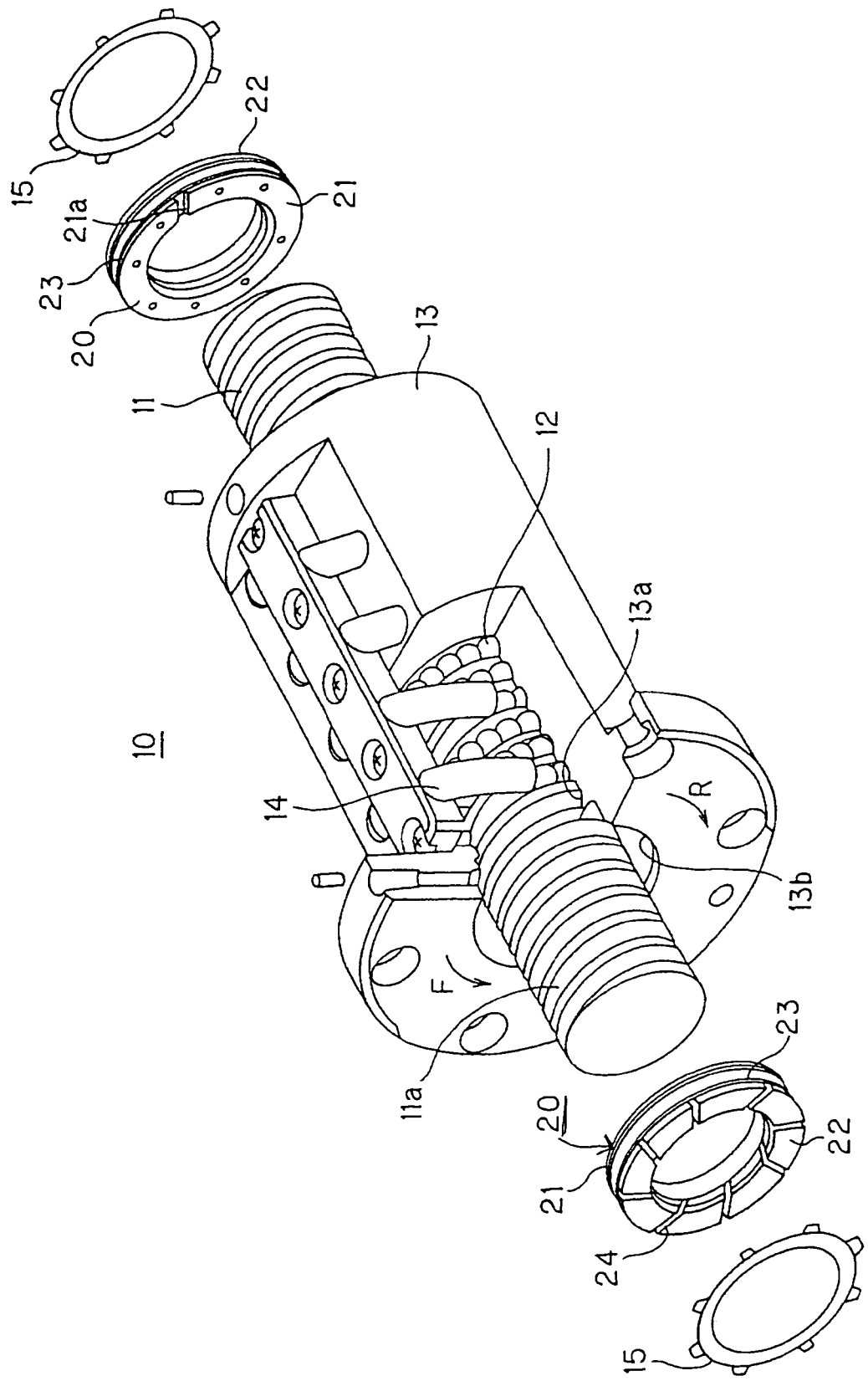
FIG. 1 is a developed perspective view of a ball screw according to one embodiment of the present invention.

First, with reference to FIG. 1, a ball screw 10 generally comprises a screw shaft 11, a number of balls 12 as rolling members and a nut (or nut member) 13 to be mounted to the screw shaft 11 through the balls 12. The nut 13 has an inner peripheral surface portion to which a ball rolling groove 13a is formed. The balls are rolled along a passage formed by a ball rolling groove 11a of the screw shaft 11 and a ball rolling groove 13a of the nut 13 in accordance with the relative rotation of the screw shaft 11 and the nut 13. When the ball 12 reaches one end portion of the ball rolling groove 13a, the ball 12 is returned to the opposite side portion of the ball rolling groove 13a through a return tube 14 fixed to the nut 13.

The nut is provided, at its both ends, with recessed portions 13b, 13b for mounting a wiper. Further, it is to be noted that, in the illustration of FIG. 1, although only the one end side of the nut 13, the other end side has substantially the same structure as that of the illustrated side.

A wiper ring 20 is mounted to each of the recessed portions 13b so as not to come off therefrom by means of stopper ring 15. The purpose of mounting the wiper ring 20 is to prevent foreign material adhering to the screw shaft 11 from invading into the nut 13 and to prevent lubrication agent(lubricant) such as grease from leaking outside.

Figure 2:
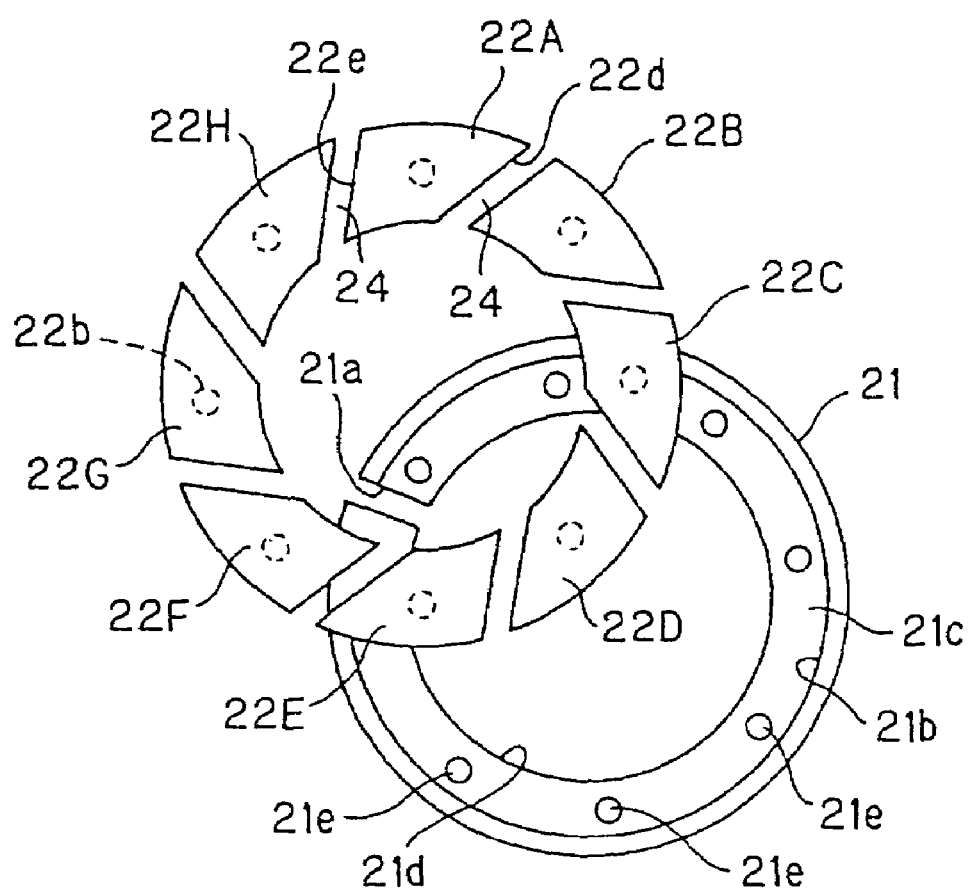
FIG. 2 is an illustration showing a relationship between a support ring of a wiper ring utilized for the ball screw of FIG. 1 and a segment.
Figure 3:
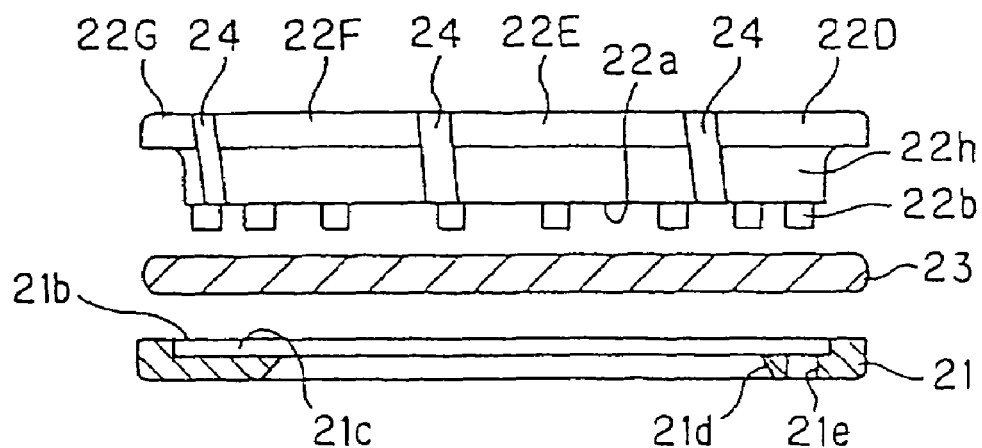
FIG. 3 is a developed sectional view of the wiper ring utilized for the ball screw of FIG. 1.
Figure 4:
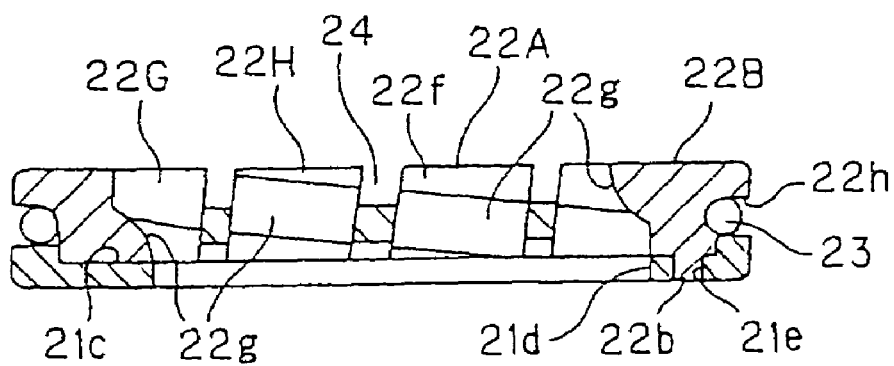
FIG. 4 is a sectional view in an axial direction of the wiper ring of FIG. 3.

FIGS. 2 to 4 show detail structure or arrangement of such wiper ring 20.

Each of the wiper rings 20 comprises a support ring 21, a plurality of segments 22A to 22H (which, hereunder, may be generally as segment(s) 22 as shown in FIG. 1) disposed on one side of the support ring 21, and a spring member (spring ring) 23 mounted to the outer peripheral portions of the segments 22. The support ring 21 and the respective segments 22 will be produced through an injection molding of a synthetic resin material, for example.

The support ring 21 is formed in shape of plate having one peripheral portion at which a bias-cut 21a is formed as shown in FIG. 2. The support ring 21 is further formed, at its one side portion, with a shallow recessed portion 21b having a bottom portion acting as a mounting surface of the segment 22. Further, the spring ring 23 is formed by connecting both ends of a coil spring so as to provide a ring shape.

The support ring 21 has an inner peripheral surface 21d which is formed to be equal to a contour shape on the axially perpendicular sectional surface of the outer periphery of the screw shaft 11 so as to be closely contacted to the screw shaft 11. Further, in a case where the inner peripheral surface 21d of the support ring 21 is formed to have an inclination so as to cross at an acute angle with respect to the mounting surface 21a of the support ring 21, the tightness of the support ring 21 to the screw shaft 11 will be enhanced. Moreover, in a case where the inner peripheral surface 21d of the support ring 21 can be manufactured with high performance to thereby highly ensure the tightness to the screw shaft 11, it may be not necessary to form the bias-cut 21a mentioned before, and the support ring 21 may be formed in the endless ring shape.

The respective segments 22 (22A to 22H) are formed independently and assembled to be separable. The segment 22 has a rear (back) surface 22a facing the support ring 21, and a pin 22b, as a support shaft member, is located to each of the segments 22 so as to extend towards the screw shaft 11. Further, hole portions (holes) 21e are also formed on the support ring 21 so as to penetrate the same at a portion corresponding to the location of the pin 22b. It is, however, not always necessary to form the hole 21b to penetrate the support ring 21, and it is permitted for the hole 21b to be opened to the mounting surface 21c opposing to the segment 22.

The respective segments 22 can be attached onto the mounting surface 21c of the support ring 21 to be turnable about the pins 22b by fitting the pins 22b into the holes 21e, respectively. According to such fitting, the respective segments 22 are arranged side by side along the peripheral direction of the support ring 21 with slits 24 between adjacent end faces 22d and 22e in the peripheral direction, and all the pins 22b are interconnected respectively through the support ring 21. Further, with reference to FIG. 2 or 3, in order to scoop and then discharge foreign material in the ball rolling groove 11a outside the nut 13, the end faces 22d and 22e of the respective segments 22 mentioned above are obliquely inclined with respect to the radial and axial direction of the screw shaft, respectively. In the illustrated embodiment, although the slit 24 is described with a constant width, it may be formed so as to be widened on the outer peripheral side thereof.

Furthermore, each of the segments 22 is formed, at its inner peripheral surface 22f, with a protrusion 22g in form of string, as shown in FIG. 4, which is fitted to the ball rolling groove 11a of the screw shaft 11. Further, each of the segments 22 is formed, at its outer peripheral portion, with a groove 22h along the circumferential direction thereof. When the segments 22 are assembled with the support ring 21 by fitting the pins 22b of the respective segments 22 into the holes 21e of the support ring, the outer peripheral grooves 22h of the respective segments 22 become continuous to thereby provide one annular groove into which the spring ring 23 is fitted in an expanded state. According to the restoring force of the spring ring 23, the respective segments 22 are pressed on the radially central side of the screw shaft 11 (i.e., the radially central side of the support ring 21). Thus, the inner peripheral portions 22f of the respective segments 22 function as sealing means in close contact to the screw shaft 11. Further, in order to prevent the segments 22 from coming off from the support ring 21, it is desirable to form the pins 22b by coming-off prevention means such as press-fitting method, calking method (i.e., a method in which the front end of the pin 22b projecting over the hole 21e is fused to be secured) or like method. However, it is necessary to fit the pin 22b to be rotatable (turnable) into the hole 21e.

The protrusion 22g in shape of string is twisted in a spiral shape along the ball rolling groove 11a of the screw shaft 11, and the shape thereof may differ in accordance with the attachment positions of the segments 22A to 22H. Accordingly, the respective segments 22A to 22h have different shapes from each other in their inner peripheral portions 22f. Thus, it is difficult to produce the respective segments by one common mold. On the other hand, since the protrusions 22g are fitted into the one continuous ball rolling groove 11a, it is required for the protrusions 22g of the respective segments 22 to be continuous to describe one spiral string along the ball rolling groove 11a. In order to satisfy such requirement, it would be necessary to form cavities corresponding to the respective segments 22A to 22H in one set of mold halves to thereby form the segments at once. In such method, it is possible to prescribe, by the mold, the dimensional performance of the respective segments 22A to 22H and the relative positional relationship therebetween, so that the respective segments 22A to 22H can be produced more precisely in comparison with the case that the respective segments are produced independently. Moreover, in the integral structure of the support ring 21 and the segments 22, the shape of the mold is made complicated so as to withdraw a core forming the spirally twisted protrusions 22g. However, in the case of the present embodiment in which the respective segments 22A to 22H are formed integrally from each other, since the respective segments are not restricted or affected from each other, so that it is possible to easily withdraw the core forming the inner peripheral portions of the segments 22, thus simplifying the structure of the mold.

The wiper ring 20 thus formed is set to the recessed portion 13b of the nut 13 so as to be directed inside the axial direction of the nut. In the state that the wiper ring 20 is mounted onto the screw shaft 11, even if the support ring 21 is deformed to widen the bias-cut 21a, the segments 22 receiving the force of the spring ring 23 are rotated in a manner that the inner peripheral portions 22f of the respective segments 22 are rotated about the pins 22b so as to be closely contacted to the screw shaft 11. As a result, the respective segments 22 are equally and tightly contacted to the screw shaft 11, and hence, the sealing performance of the wiper ring 20 can be achieved.

Figure 5:
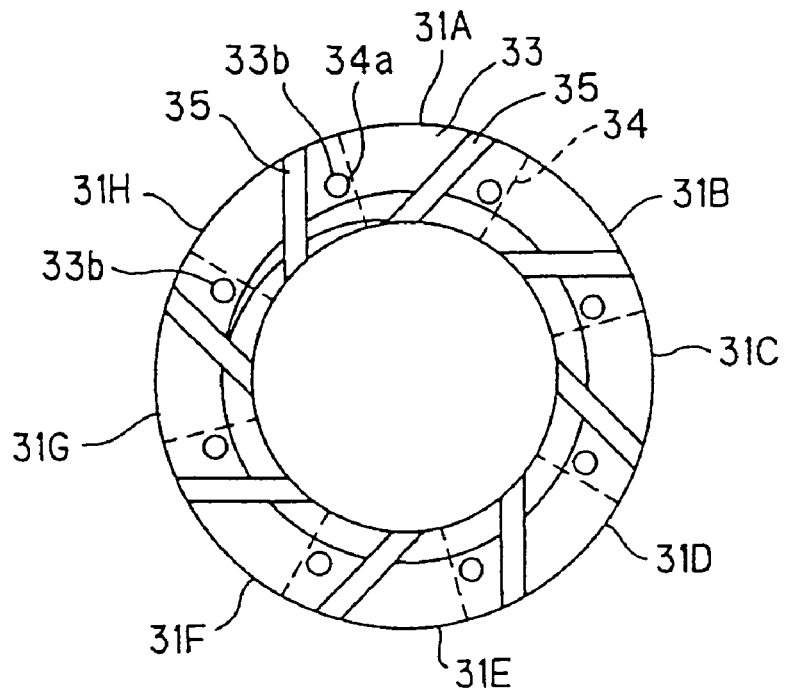
FIG. 5 is a front view of another wiper ring for the ball screw of the present invention.
Figure 6:
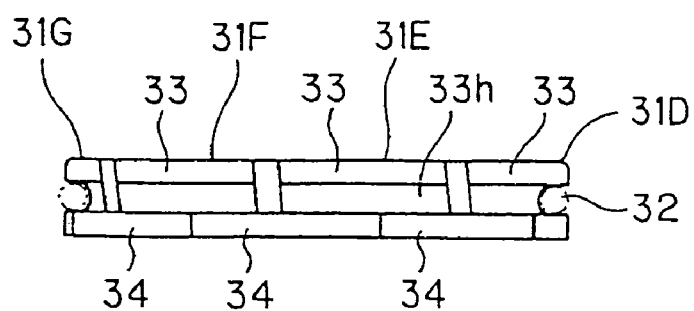
FIG. 6 is a plan view of the wiper ring of FIG. 5.
Figure 7A:
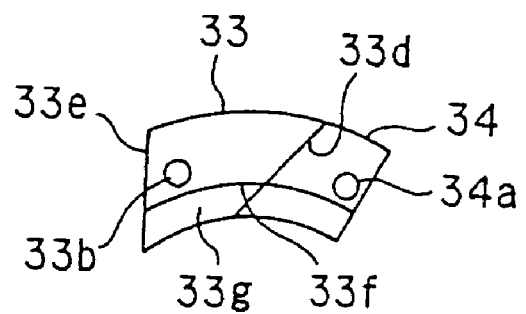
FIG. 7 represents a segment to be utilized for the wiper ring of FIG. 5 and includes FIG. 7A of a front view thereof and FIG. 7B of a plan view thereof.
Figure 7B:
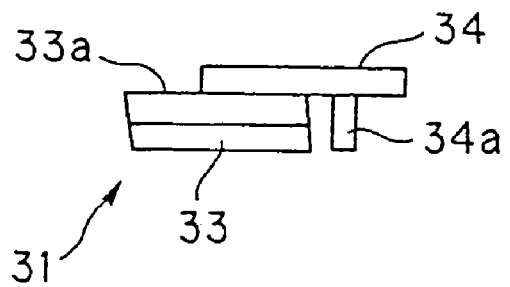

FIGS. 5 to 7 represent another embodiment of the wiper ring according to the present invention.

With reference to FIGS. 5 to 7, a wiper ring 30 of this embodiment is provided with a plurality of segments 31 (31A to 31H, eight, in the illustration) and a spring ring 32, which is identical structure to that of the wiper ring 20 of the former embodiment. However, in this embodiment, any support ring, such as that 21 in the former embodiment, is not provided, and in substitution therefor, the segment 31 is formed with a segment body 33 and a support plate 34. The respective segments 31A to 31H are formed independently as separate members to thus be separable, and the segment body 33 and the support plate 34 in each segment 31 are formed of resin material integrally with each other.

The segment body 33 is not provided with a support shaft member such as pin 22b for the segment 22 in the former embodiment, and instead, holes 33b are formed. Except for this structure, the segment 33 has substantially identical shape or structure as that of the segment 22. Accordingly, constitutional elements of the segment 33 of this embodiment corresponding to the elements 22a and 22c to 22h of the segment 22 in the former embodiment are added only with reference numerals 33a, 33c to 33h, respectively, and the descriptions or explanations thereof are omitted herein.

Furthermore, as like in the former embodiment, it is preferred to form the respective segments 33A to 33H at once by one set of mold halves because of the same reason as that mentioned before with respect to the wiper ring 20.

The support plate 34 serves like the support ring 21 of the wiper ring 20 in the former embodiment, and the support plates 34 are shifted in their phases in the peripheral direction with respect to the segment bodies 33 and formed, on their surfaces, with pins 34a as support shafts, to be fitted to the holes 33b formed on the segment bodies 33. However, any one of the segments (for example, segment 31G) is not provided with such pin 34a, and in this connection, the hole 33b of the segment 31H adjacent to this segment 31G may be eliminated.

The segments 31A to 31H thus constructed are arranged side by side so as to describe a circle and then connected together by fitting each of the pins 34a into the hole 33b of each of the adjacent segments. Thereafter, the spring ring 32 is fitted into the grooves 33h formed on the outer periphery of the segment bodies 33 to thereby complete the wiper ring 30 of this embodiment. In such wiper ring 30, slits 35, like the slits 24 of the wiper ring 20 of the former embodiment shown in FIG. 2, are formed between the respective bodies 33 of the connected segments 31A to 31H. Further, the support plates 34 of the respective segments 31 are arranged to be continuous in their peripheral direction and, accordingly, a ring-shaped plate like the support ring 21 of the wiper ring 20 is formed. However, as mentioned above, as the segment 31G is not provided with the pin 34a, the segments 31H and 31G are not connected. According to the described structure, the wiper ring 30 is also formed with a cutout portion (separated portion) identical to the bias-cut 21a of the wiper ring 20 of FIG. 2. Further, it is desired that the connection between the pin 34a and the hole 33b of the segment 31 by coming-off prevention methods such as press-fitting method or calking method carried out with reference to the connection between the pin 22b and the hole 21e of the wiper ring 20. In such method, however, it is necessary for the pin 34a to be fitted to the hole 33b in the rotatable manner.

Furthermore, in the wiper ring 30 of this embodiment, the support plate 34 is also mounted to the recessed portion 13b of the nut so as to be directed axially inward of the nut 13. The mounting of the wiper ring 30 onto the screw shaft 11 permits to rotate the inner peripheral portions 33f of the respective segment bodies 33 about the pins 34a so as to be closely contacted to the screw shaft 11 while the respective segments 31 receiving the force of the spring ring 32 even if the wiper ring 30 so deformed as that the non-connected segments 31G and 31H are relatively separated from each other in the circumferential direction. As a result, the respective segments 31 can be equally and well contacted to the screw shaft 11, and hence, the sealing performance due to the wiper ring 30 can be achieved.

Further, it is to be noted that the present invention is not limited to the described embodiments and many other changes and modifications may be made without departing from the scopes of the appended claims.

For example, with the wiper ring 20 of FIG. 2, the pin 22b may be provided for the support ring 21 and, on the other hand, the hole 21e may be formed on the segment 22. With the wiper ring 30, also, the arrangement of the hole 32b and the pin 34a may be substituted with each other. Furthermore, the lengths in the circumferential directions of the respective segments 22A to 22H and 31A to 31H may be made equal to each other or different from each other, and the number of the segments 22 and 31 is not limited to eight (8).

The present application claims priority under 35 U.S.C § 119 to Japanese Patent Application No. 2000-358245 filed Nov. 24, 2000 entitled "WIPER RING AND BALL SCREW PROVIDED WITH WIPER RING". The contents of that application are incorporated herein by reference in their entirety.

What is claimed is:

1. A wiper ring to be applied to screw unit having a shaft member comprising:
    a plurality of segments each having a seal portion to be contacted to the shaft member, said segments being arranged in a circumferential direction of the shaft member; and
    a spring member for urging the segments arranged in the circumferential direction of the shaft member in the radially central direction of the shaft member,
    wherein (N-2) segments in said plural segments (N: total number thereof) are formed with support shafts extending in an axial direction of the shaft member and hole portions for receiving the support shafts in an arrangement shifted in the circumferential direction of the shaft member, either one of remaining two segments is provided with the support shaft and another one of the remaining two segments being formed with the hole portion, said segments being connected to each other by fitting the support shafts to the hole portions of the adjacent two segments in the circumferential direction in a manner that said remaining two segments are unconnected.

2. A wiper ring according to claim 1, wherein a slit is formed between adjacent segments when the respective segments are connected.

3. A wiper ring according to claim 1, wherein said shaft member is a screw shaft of a ball screw.

4. A ball screw comprising:
    a screw shaft;
    a number of rolling members to be applied to said screw shaft;
    a nut mounted to said screw shaft through said rolling members; and
    a wiper ring mounted to at least one axial end portion of said nut, said wiper ring comprising:
    a plurality of segments each having a seal portion to be contacted to the shaft member, said segments being arranged in a circumferential direction of the shaft member; and
    a spring member for urging the segments arranged in the circumferential direction of the shaft member in the radially central direction of the shaft member,
    wherein (N-2) segments in said plural segments (N: total number thereof) are formed with support shafts extending in an axial direction of the shaft member and hole portions for receiving the support shafts in an arrangement shifted in the circumferential direction of the shaft member, either one of remaining two segments is provided with the support shaft and another one of the remaining two segments being formed with the hole portion, said segments being connected to each other by fitting the support shafts to the hole portions of the adjacent two segments in the circumferential direction in a manner that said remaining two segments are unconnected.

* * * * *